United States Patent
Demopoulos

(10) Patent No.: US 12,252,412 B2
(45) Date of Patent: Mar. 18, 2025

(54) METHOD FOR PRODUCING SCORODITE

(71) Applicant: THE ROYAL INSTITUTION FOR THE ADVANCEMENT OF LEARNING/MCGILL UNIVERSITY, Montréal (CA)

(72) Inventor: George Demopoulos, Montreal (CA)

(73) Assignee: THE ROYAL INSTITUTION FOR THE ADVANCEMENT OF LEARNING/MCGILL UNIVERSITY, Montréal (CA)

(*) Notice: Subject to any disclaimer, the term of this patent is extended or adjusted under 35 U.S.C. 154(b) by 674 days.

(21) Appl. No.: 17/614,429

(22) PCT Filed: May 25, 2020

(86) PCT No.: PCT/CA2020/050706
§ 371 (c)(1),
(2) Date: Nov. 26, 2021

(87) PCT Pub. No.: WO2020/237361
PCT Pub. Date: Dec. 3, 2020

(65) Prior Publication Data
US 2022/0234909 A1 Jul. 28, 2022

Related U.S. Application Data

(60) Provisional application No. 62/853,363, filed on May 28, 2019.

(51) Int. Cl.
*C01G 49/00* (2006.01)

(52) U.S. Cl.
CPC ...... *C01G 49/0018* (2013.01); *C01P 2002/72* (2013.01); *C01P 2004/03* (2013.01)

(58) Field of Classification Search
CPC ............. C01G 49/0018; C01P 2002/72; C01P 2004/03
See application file for complete search history.

(56) References Cited

U.S. PATENT DOCUMENTS

| | | | |
|---|---|---|---|
| 7,935,328 B2* | 5/2011 | Kimura | C01G 49/14 423/601 |
| 8,465,723 B2* | 6/2013 | Fujita | C22B 3/20 423/601 |
| 2008/0075644 A1 | 2/2008 | Fujita et al. | |

FOREIGN PATENT DOCUMENTS

| | | |
|---|---|---|
| CA | 2618326 | 9/2008 |
| CA | 2679357 | 9/2008 |
| CA | 2758394 A1 | 11/2010 |
| JP | 2010285322 | 12/2010 |
| WO | 0123628 A1 | 4/2001 |

(Continued)

OTHER PUBLICATIONS

Jahromi, Fazel G., and Ahmad Ghahreman. "In-situ oxidative arsenic precipitation as scorodite during carbon catalyzed enargite leaching process." Journal of hazardous materials 360 (2018): 631-638.*

(Continued)

*Primary Examiner* — Richard M Rump
(74) *Attorney, Agent, or Firm* — Christian Cawthorn; NORTON ROSE FULBRIGHT CANADA LLP

(57) ABSTRACT

This invention relates to safe immobilization and disposal of arsenic found in industrial waste streams and residues in the form of clean and compact well grown scorodite solids.

12 Claims, 8 Drawing Sheets

(56) References Cited

FOREIGN PATENT DOCUMENTS

WO 2010094841 8/2010
WO 2019000091 A1 1/2019

OTHER PUBLICATIONS

Shinoda, Kozo, et al. "Coprecipitation of large scorodite particles from aqueous Fe (II) and As (V) solution by oxygen injection." Materials transactions 50.5 (2009): 1196-1201.*

Pozas, R., et al. Uniform Nanosized Goethite Particles Obtained by Aerial Oxidation in the FeSO4—NA2CO3 System, Journal of Colloid and Interface Science, vol. 254, pp. 87-94, Oct. 1, 2002.

Demopoulos, G.P.: "On the Preparation and Stability of Scorodite". Arsenic Metallurgy, R.G. Reddy and V. Ramachandran, Eds., TMS, Warrendale, PA. 2005. pp. 25-50.

Demopoulos, G.P. et al.: "The Atmospheric Scorodite Process", Copper 2003—Hydrometallurgy of Copper, P.A. Riveros, D. Dixon, D.B. Dreisinger and J. Menacho (Eds.), CIM, Montreal, 2003, pp. 597-616.

Guo, F. and Demopoulos, G.P.: "Development of an Encapsulation Process to Extend the Stability of Scorodite Under Wider PH and Redox Potential Range Conditions". The Minerals, Metals & Materials Society. 2018. pp. 1411-1420.

Jia, Y. and Demopoulos, G.P.: "Coprecipitation of arsenate with iron(III) in aqueous sulfate media: Effect of time, time as base and co-ions on arsenic retention". Water Research. 42. (2008) pp. 661-668.

Singhania, S. et al.: "Temperature and Seeding Effects on the Precipitation of Scorodite from Sulfate Solutions under Atmospheric-Pressure Conditions". Metallurgical and Materials Transactions B. vol. 36B. (2005) p. 327-333.

* cited by examiner

METHOD FOR PRODUCING SCORODITE

CROSS-REFERENCE TO RELATED APPLICATION

This application claims benefit of U.S. provisional application 62/853,363 filed on May 28, 2019, the content of which is incorporated herein in its entirety by reference.

FIELD OF THE DISCLOSURE

This invention relates to immobilization of arsenic released from mineral processing and metallurgical operations in the form of scorodite solids that is substantially free of gypsum.

BACKGROUND OF THE DISCLOSURE

The Arsenic Problem

Arsenic is a serious environmental issue for the non-ferrous metals industry spanning from gold and copper extraction operations to uranium milling. Arsenic may be encountered in different forms in metallurgical processes including, flue dusts, acid bleed streams, various wastes, autoclave discharge solutions, process effluents/residues and ultimately tailings. By far safe disposal (residue stability) is much more challenging than simple removal of arsenic from plant streams. Over the years various methods were developed for the fixation of arsenic. The type of method selected depends on the oxidation state of arsenic and its concentration.

In this disclosure, any arsenic dust or precipitate is already dissolved in solution and consider the treatment of the solution for the removal of arsenic as a stable (from an environmental point of view) for disposal solid compound. First arsenic fixation requires arsenic to be in its pentavalent state as arsenate compounds are in general more stable than arsenite analogues. Air or oxygen may be used as oxidant but this works only in the alkaline region. For acidic solutions more drastic oxidizing chemicals have to be used like hydrogen peroxide ($H_2O_2$). The latter, however, is expensive plus tends to decompose in the presence of solids. An alternative low-cost oxidation system that can be used is a mixture of oxygen and sulfur dioxide both of which are available in metallurgical plants.

As fixation methods we can either employ coprecipitation with ferric iron in the case of low arsenic concentration solutions (typically less than 3 g/L) or scorodite precipitation in the case of arsenic-rich (and often iron-deficient) solutions. The former method is combined with lime neutralization and is suitable for dilute process effluent solutions only as it tends to generate large volume tailings.

Scorodite Production Methods

Arsenic fixation via the production of scorodite—a naturally occurring mineral ($FeAsO_4 \cdot 2H_2O$) that is known for its low solubility (i.e. good stability in water)—is considered by far the best option for fixation of arsenic from dusts, residues or acid plant effluents. Only crystalline scorodite (with sharp X-ray diffraction pattern) resembling the natural mineral is stable for use to fix arsenic. Various methods have been proposed to produce crystalline scorodite. Among these are, hydrothermal precipitation in autoclaves (i.e. 140° C.<T<180° C.), atmospheric precipitation at T<100° C. either via step-wise pH adjustment (from Fe(III)/As(V) solution) or via oxidation of ferrous sulfate solution containing arsenic (V), or by conversion of amorphous ferric arsenate (amFA) to scorodite.

A commercialized atmospheric scorodite preparation process developed originally at McGill University (G. P. Demopoulos, 2005, "Preparation and Stability of Scorodite", in Arsenic Metallurgy, R. G. Reddy and V. Ramachandran, Eds., TMS, Warrendale, PA, pp. 25-50, Demopoulos, G. P., et al "The Atmospheric Scorodite Process", Copper 2003-Hydrometallurgy of Copper, P. A. Riveros, D. Dixon, D. B. Dreisinger and J. Menacho (Eds.), CIM, Montreal, 2003, pp. 597-616.) can be separated into three main stages: (i) oxidation of trivalent arsenic; (ii) precipitation of arsenic as scorodite by pH adjustment and seeding; and (iii) a solid-liquid separation unit. In this process, Scorodite precipitation, reaction (1), is almost completed when a pH=1.5 is reached after 24 hours reaction. The pH is controlled using limestone as neutralizing agent leading to the formation of gypsum ($CaSO_4$), as is shown in reaction (2).

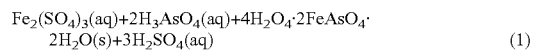

$$Fe_2(SO_4)_3(aq) + 2H_3AsO_4(aq) + 4H_2O_4 \cdot 2FeAsO_4 \cdot 2H_2O(s) + 3H_2SO_4(aq) \quad (1)$$

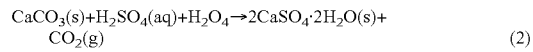

$$CaCO_3(s) + H_2SO_4(aq) + H_2O_4 \rightarrow 2CaSO_4 \cdot 2H_2O(s) + CO_2(g) \quad (2)$$

The mixed product of scorodite and gypsum after washing is sent to a landfill site. As it is practiced the process is slow (24 hours residence time) and the generated product is made of ⅓ of scorodite and ⅔ of gypsum, i.e. the % As content is diluted down to 10% from the 30% of scorodite proper, requiring three times larger landfill site.

Despite the good stability behavior exhibited by crystalline scorodite, it is known that scorodite is not stable under strong alkaline or reducing conditions. In this context as a means of increasing the stability of scorodite over a wider pH and redox potential range it was reported that encapsulation with mineralized aluminum hydroxyl-gels offers a solution (Fuqiang Guo and G. P. Demopoulos, *Extraction* 2018, The Minerals, Metals & Materials Series, pp: 1411-1420; WO2019/000091). For such encapsulation step however the scorodite particles must be substantially free of gypsum.

There is a need for scorodite solids that are substantially free of gypsum to allow for reducing the size of the required landfill sites. There is a need for scorodite solids that would allow for encapsulation of scorodite with mineralized aluminum hydroxyl-gels. There is therefore an added need for the development of a process able to produce scorodite solids substantially free of gypsum.

SUMMARY OF THE DISCLOSURE

In one aspect, there is provided a process for producing crystalline scorodite substantially free of gypsum, comprising adding an iron oxyhydroxide compound into an arsenic solution in pentavalent state to cause the formation of said scorodite;

or a first step of adding a ferric iron solution (such as a ferric sulfate solution) into an aqueous acidic solution of arsenic solution in pentavalent state (As(V)) to cause the formation of an amount of said scorodite, optionally followed by a second step of adding an iron oxyhydroxide compound into said arsenic solution in pentavalent state to cause the formation of a further amount of said scorodite;

wherein said process is conducted at a temperature of from about 30° to about 100° C.

In a further aspect, there is provided a scorodite substantially free of gypsum (CaSO$_4$.2H$_2$O), wherein said scorodite is crystalline as characterized by X-ray diffraction analysis.

In still a further aspect, there is provided a scorodite substantially free of gypsum (CaSO$_4$.2H$_2$O), wherein said scorodite is crystalline as characterized by X-ray diffraction analysis prepared by the process herein.

DETAILED DESCRIPTION OF THE DISCLOSURE

Figure 1:
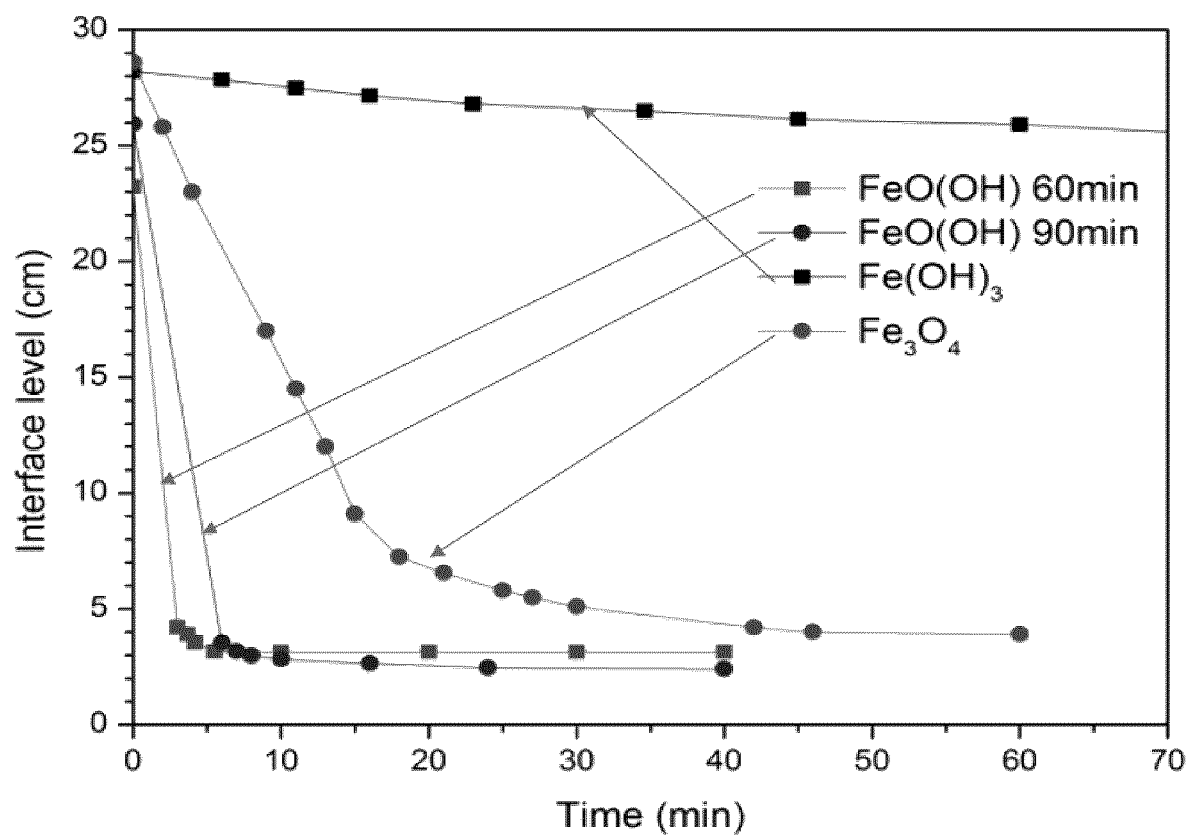
FIG. 1. Relative settling rates (measured in terms of settled solids/clear supernatant interface) of different types of iron oxyhydroxides precipitates.

The process is achieved via a novel non-autoclave atmospheric scorodite precipitation process from As(V)-bearing sulfuric acid solutions without using lime (usually calcium oxide and/or calcium hydroxide) or limestone ((CaCO$_3$)) as base. A feature of the new process is the driving of scorodite formation reaction by controlled addition of iron salts or compounds directly in the precipitation reactors. Advantageously part of the iron is added as iron oxyhydroxide produced from Fe(II) sulfate solutions in a separate circuit. The said iron oxyhydroxide provides simultaneous control of supersaturation (regulated by its dissolution rate) and pH (due to its neutralizing property) thus favoring production of well grown crystalline and stable scorodite solids that are clean and compact suitable for safe disposal in smaller size waste management sites than conventional scorodite-gypsum mixtures.

The process can be applied to arsenic (V)-containing acidic solutions typically generated as bleed off of metallurgical plants (such as acid plant effluents or spent electrorefinery electrolytes) or generated via leaching of arsenical flue dusts or other arsenical residues and wastes. Such arsenic-containing acidic solution may be either pre-oxidized to ensure all dissolvent arsenic is in the pentavalent (V) state or it may simply be oxidized (if contains some As(III) fraction) during precipitation of scorodite. In contrast with previous methods that had such arsenic-containing solutions enriched with stoichiometric or excess amounts of iron (i.e. molar ratio of Fe/As≥1) as Fe(II) or Fe(III) prior to feeding such solution to scorodite precipitation reactor(s), in this disclosure iron is added directly into the scorodite precipitation reactor(s) at Fe/As molar ration <1 at least in part as iron oxyhydroxide solids.

In embodiments of the process for producing scorodite, the process is comprising:

adding an iron oxyhydroxide compound/precipitate into an aqueous acidic solution of arsenic in its pentavalent state (As(V)) to cause the formation of said (crystalline) scorodite, said process is conducted at a temperature between 30° and 100° C. and preferably above 50° C. or between 80° and 95° C.;

said (As(V)) is prepared by oxidation of an As(III) containing solution before or during said step of forming scorodite;

said solution of As(V) has a concentration of from about 1 g/L to about 100 g/L or more typically from about 10 to about 70 g/L or about 20 to about 60 g/L.

said acidic solution is a strong acidic solution such as generated preferably from H$_2$SO$_4$ leaching operations, or alternatively from HCl or HNO$_3$, or mixed acids;

the acid concentration range can be anywhere from less than 0.1 mol/L to >1 mol/L (pH<1.5) and most commonly with pH<1 (or concentration >0.1 mol/L) or advantageously between 0.1 to 1.0 mol/L;

optionally adding in above acidic solution scorodite as seed to promote the growth of freshly produced scorodite;

said produced scorodite is crystalline as characterized by X-ray diffraction (XRD);

said step of adding an iron oxyhydroxide (FeOOH) compound into said aqueous acidic solution of arsenic is maintaining a molar ratio of Fe/As≤1;

said step of adding an FeOOH compound into said aqueous acidic solution of arsenic is comprising separate additions of divided amounts of FeOOH compound (total 1≤Fe/As≤1.5), with interruption between said additions;

said divided amounts are comprising at least two amounts, or at least 3 amounts;

said each of said divided amounts independently represents a molar ratio of said Fe from about 0.1 to about 0.7 mol relative to one mol of As(V);

said process is further comprising a step of recovering said scorodite from a solution resulting from said process;

said process is further (optionally) comprising a step of removing the residual arsenic from the solution resulting from said process by co-precipitation, separation of the co-precipitate, and return to the scorodite formation tank(s);

said co-precipitate recovered from post-scorodite precipitation step is amorphous ferric arsenate/hydroxide;

said step of removing residual soluble arsenic in the form of amorphous ferric arsenate/hydroxide is comprising adding small excess of ferric iron to solution resulting from said process and adding inorganic base to cause formation of said amorphous ferric arsenate/hydroxide;

wherein said inorganic base is selected from MgO, ZnO or ZnCO$_3$, Cu(OH)$_2$, CuO or CuCO$_3$;

wherein said step of adding an FeOOH compound into said aqueous acidic solution of an arsenic compound is performed with simultaneous sparging of air or oxygen;

said process is comprising a step of adding a ferric iron solution to said acidic solution of (As(V)) at Fe(III)/As(V)<1 to cause precipitation of scorodite before adding said FeOOH compound (total iron added in molar units: 1≤Fe/As≤1.5);

said ferric iron is ferric sulfate;

said ferric sulfate solution is added to said solution of arsenic compound in separate divided amounts from about 0.1 to about 0.7 mol relative to one mole of As(V);

wherein in said step of adding a ferric iron solution the addition of said ferric iron is at Fe(III)/As(V) molar ratio <1, and in said addition of iron oxyhydroxide the addition is at a Fe/As molar ratio <1 (total iron added in molar units 1≤Fe/As≤1.5);

said process is further comprising seeding scorodite crystals before or after said step of adding said FeOOH before or after said step of adding a ferric iron solution;

said iron oxyhydroxide is prepared by reaction of $FeSO_4$-containing acidic solution with oxidation using for example air or $O_2$, in presence of a base that does not form secondary precipitates like gypsum (calcium containing bases) or jarosite (sodium or ammonium or potassium containing bases under certain conditions etc.). Examples of bases include without limitation MgO, ZnO or $ZnCO_3$ or $Cu(OH)_2$ or CuO or $CuCO_3$.

In embodiments of the process for producing scorodite, comprising
adding an iron oxyhydroxide (FeOOH) compound into an aqueous acidic solution of an arsenic compound in a pentavalent state (As(V)),
wherein said FeOOH is produced via oxydrolysis involving regulated air or oxygen sparging and neutralization—with a non-calcium base—of ferrous sulfate solution.

In embodiments of the process for producing scorodite, comprising
adding an iron oxyhydroxide compound into an aqueous acidic solution of an arsenic compound in a pentavalent state (As(V)),
wherein said iron oxyhydroxide can be produced by oxydrolysis or can be a natural mineral source or industrial iron oxide or hydroxide residue.

As used herein, the expression "substantially free" is known to the skilled person. In any event, it is desired that the scorodite defined herein is comprising less than about 30%, or more preferably less than about 10%, or less that about 5% gypsum (wt/wt % based on the total amount of scorodite and gypsum).

EXAMPLES

A. Production of Iron Oxyhydroxide

For an iron oxyhydroxide precipitate to be suitable for industrial production of scorodite it is important that is characterized by good settling/filtration/dewatering properties so it can be easily separated from mother liquor and transferred to scorodite precipitation tanks. It is well known that iron (III) hydroxides obtained by direct hydrolysis/neutralization of ferric sulfate ($Fe_2(SO_4)_3$) solutions tend to be voluminous with poor dewatering properties. This problem becomes totally prohibitive especially when precipitation from high concentration ferric sulphate solutions is attempted. With this in mind, we embarked into an investigation to identify the best method of producing iron oxyhydroxides for atmospheric scorodite precipitation where they simultaneously act as a base and provide a source of iron. Iron hydroxides were produced by reacting various inorganic bases (other than CaO or $CaCO_3$) with ferrous sulphate $FeSO_4$ or ferric sulfate ($Fe_2(SO_4)_3$) solutions with ~0.3-0.5 M iron concentration. The precipitates were decanted and then used to produce scorodite. Iron oxyhydroxides were synthesized using a number of reagents and conditions to yield a product with favourable settling characteristics. Seven bases were used; NaOH, $NaHCO_3$, $Na_2CO_3$, $MgCO_3$, MgO, ZnO, and $Mg(OH)_2$. In a typical test 0.5 L of 0.45M $FeSO_4$ was prepared and transferred to the reaction vessel. All tests were carried out at room temperature. The solution was agitated with an axial impeller, set to 615 rpm while in some experiments oxygen was supplied via a sparger. Base was added by peristaltic pump. Water insoluble bases were kept in slurry by continuous mixing with a magnetic stir bar. The concentration of base was adjusted so that hydrolysis would occur at approximately the same rate for each base. Base was added until the target pH between pH 5-7 was reached. Base addition was stopped and the pH was allowed to stabilize while stirring continued. Stabilization was generally achieved within 15 minutes, although the exact time depended on the base used. By far the iron oxyhydroxide produced with MgO as base had the best settling properties and was kept for further study.

The precipitation of iron oxyhydroxide from $FeSO_4$ solution by reaction with MgO slurry and oxidation is described by the following reaction (3):

$$2MgO+2FeSO_4+1/2O_2+H_2O=2FeOOH+2MgSO_4 \quad (3)$$

The reaction depending on the reaction time, oxygen sparging and source of iron yielded different iron oxyhydroxides (goethite, mixture of goethite and lepidocrocite, green rust, magnetite, or iron hydroxide) as summarized in Table 1.

TABLE 1

Iron oxyhydroxides obtained with different preparation conditions.

| No. | Iron Oxyhdroxides Produced | $O_2$ Sparging | pH Final | Reaction Time (minutes) |
|---|---|---|---|---|
| [FeSO$_4$•7H$_2$O] = 0.35 mol/L, [MgO] = 1.01 mol/L, room temperature, Agitation: 630 rpm | | | | |
| 1 | Lepidocrocite (γ-FeO(OH)) and goethite | Yes | 7.5 | 90 |
| 2 | Goethite (α-FeO(OH)) | Yes | 5.5 | 60 |
| 3 | Magnetite (Fe$_3$O$_4$) and green rust II | No | 7.5 | 120 |
| [Fe$_2$(SO$_4$)$_3$•xH$_2$O] = 0.17 mol/L, [MgO] = 1.01 mol/L, room temperature, Agitation: 630 rpm | | | | |
| 4 | Iron hydroxide (Fe(OH)$_3$, amorphous) | No | 7.2 | 120 |

The settling rates of the different iron oxyhydroxides/oxides are compared in FIG. 1. As it can be seen the iron oxyhydroxides (FeOOH) (goethite and lepidocrocite) obtained after 60 and 90 min reaction give the faster settling rate therefore are best suited to use in producing scorodite. At 90 min reaction time more than 90% iron has precipitated as oxyhydroxide.

B. Precipitation of Scorodite with FeOOH as Source of Iron

Figure 2A:
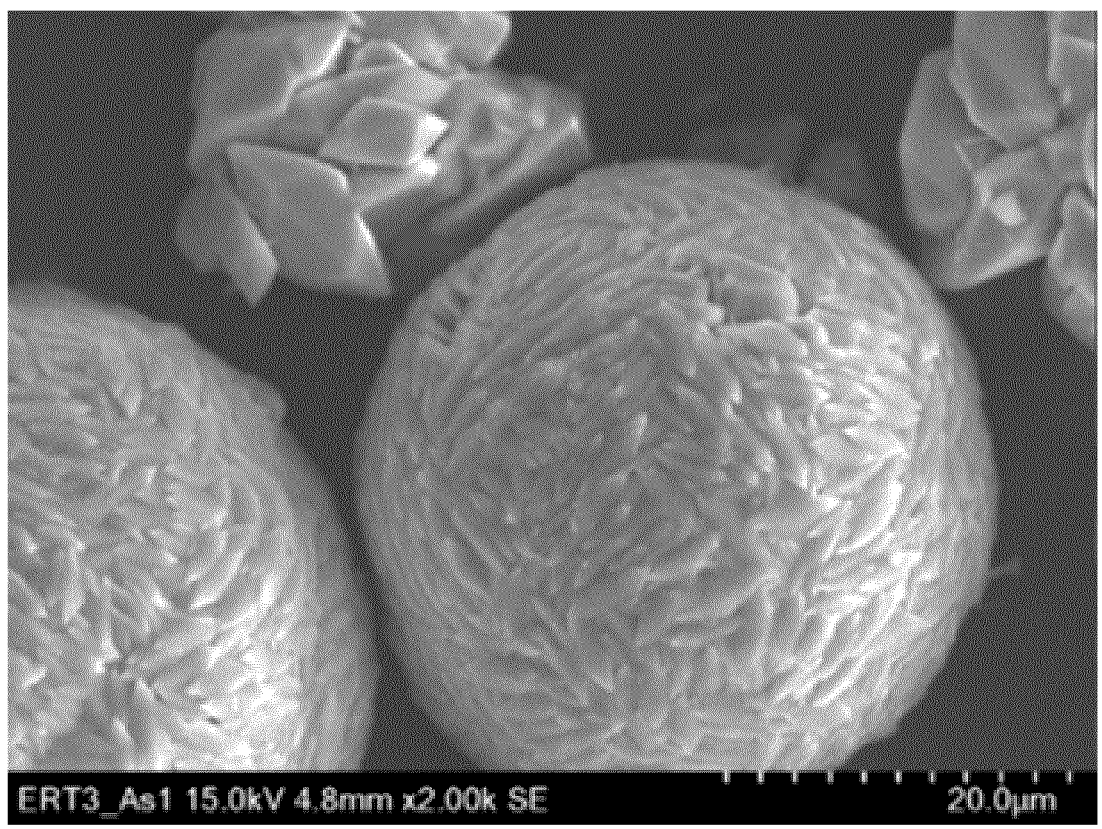
FIG. 2A and FIG. 2B: SEM images of scorodite obtained by reaction of As(V) solution with FeOOH precipitate (lepidocrocite) in two different batches.
Figure 2B:
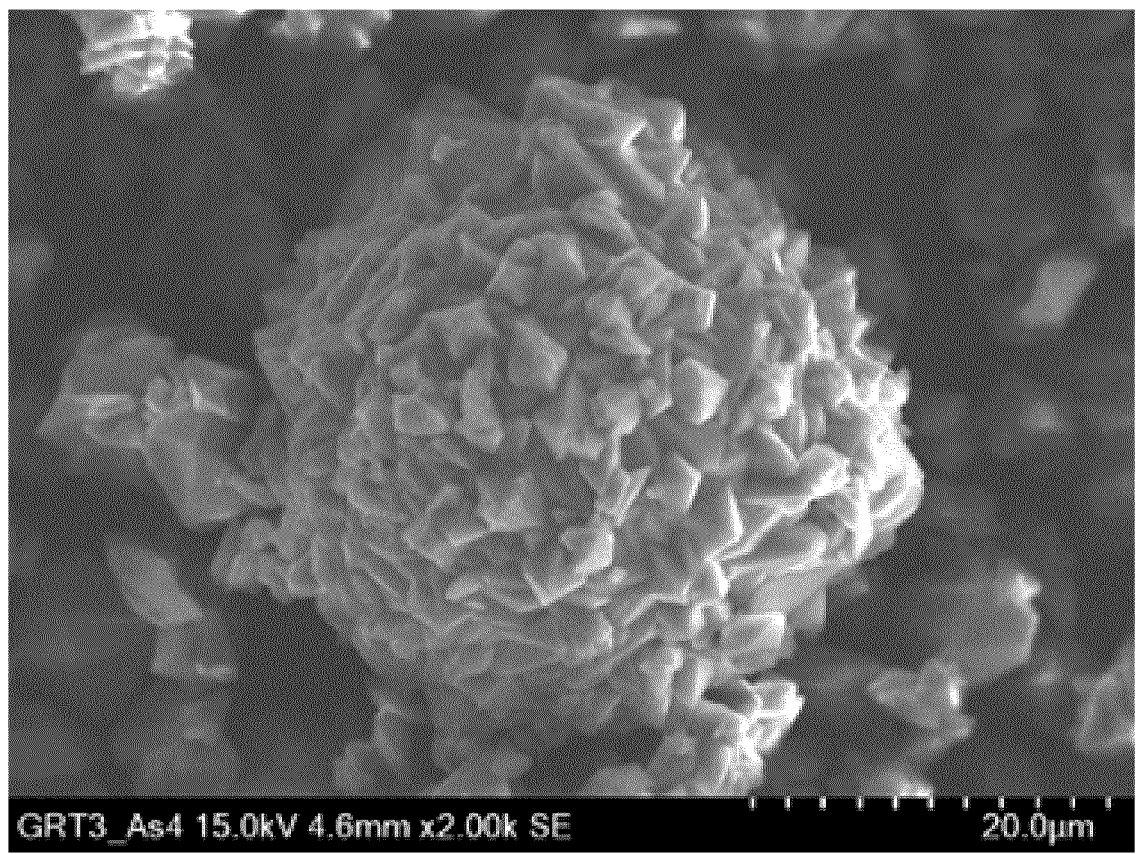
Figure 4:
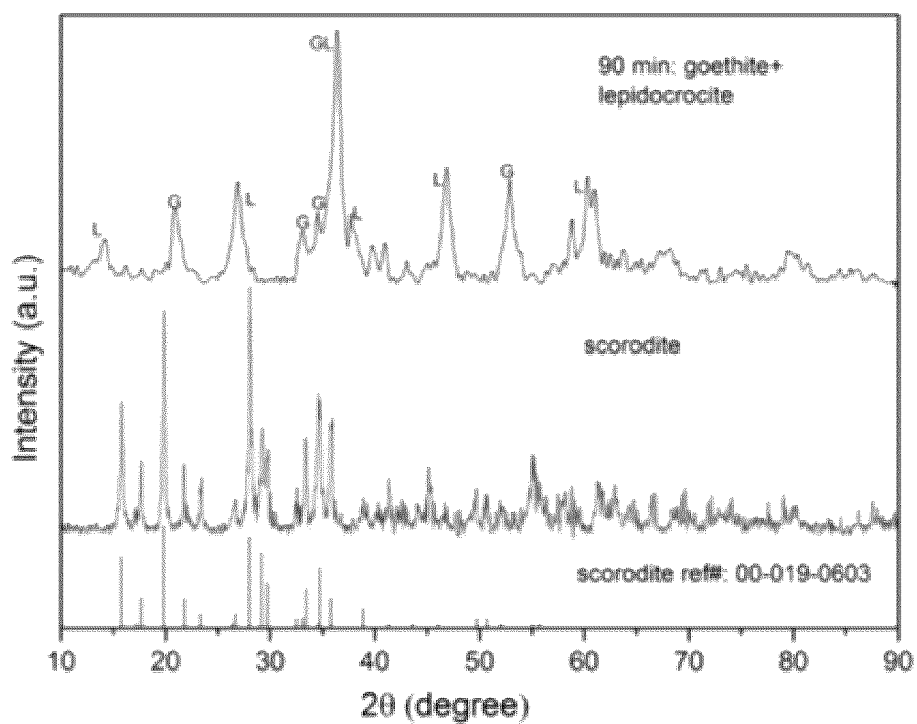
FIG. 4: XRD pattern of scorodite produced using iron oxyhydroxide (from EXP90 min; its XRD is included) presented along the reference pattern of scorodite mineral.

Here we demonstrate the production of scorodite by using as sole source of iron and base the iron oxyhydroxide produced from 0.45 M $FeSO_4$ solution using MgO/$Mg(OH)_2$ as base and oxygen sparging as per methods established in Part A. In a typical test 750 mL of 40 g/L arsenic(V) solution was prepared and transferred to the precipitation reactor. The solution was stirred at 500 rpm until clear, approximately two hours. Seed (produced via a hydrothermal step (S. Singhania et al., Metall. Mater. Trans. B. (2005), 36B, 327-333) was introduced within 5 minutes of starting the scorodite reaction (if applicable). Iron oxyhydroxide slurry was slowly added via peristaltic pump over a two-hour period. Temperature was held constant at ~90° C. during iron oxyhydroxide addition. No oxygen sparging was provided in these tests. After four hours, the temperature was reduced to 50° C. The system was allowed to equilibrate for a further 20-24 hours at 50° C. After the test, the precipitated solids and remaining solution were pressure filtered and rinsed with deionized water. XRD analysis confirmed the formation of scorodite as shown in FIG. 4. SEM pictures of scorodite produced using FeOOH (lepidocrocite) are shown in FIGS. 2A and 2B. The good crystallinity of the particles is clearly evident. In this test series (involving single stage addition of FeOOH in As(V) solution at Fe/As molar ratio ~1) some 50% As precipitated over 4 hours at ~90° C. (reaction stopped after T was dropped to 50° C.).

C. Staged Precipitation of Scorodite with Fe(III) Salt and FeOOH

Here we describe the production of scorodite via a two-step process: In Step 1 ferric sulfate is added to an acidic As(V) solution (40 g/L) at a molar ratio Fe(III)/As(V)=0.7 for partial precipitation of scorodite followed in Step 2 with addition of FeOOH been prepared as in Part A.

Table 2 shows the arsenic and iron concentration during the precipitation reaction of Step 1. The arsenic removal percentage is 59.91%.

TABLE 2

Arsenic and iron concentration during scorodite precipitation with Fe(III)/As = 0.7 (STEP1).

| Reaction time (hours) | 0 | 1 | 2 | 4 | 6 |
|---|---|---|---|---|---|
| [As] (g/L) | 36.64 | 33.93 | 29.82 | 21.50 | 14.60 |
| [As] (mol/L) | 0.489 | 0.453 | 0.398 | 0.287 | 0.196 |
| As removal % | — | 7.39 | 18.61 | 41.31 | 59.91 |
| [Fe] (g/L) | 19.687 | 17.48 | 14.66 | 7.88 | 2.22 |
| [Fe] (mol/L) | 0.352 | 0.313 | 0.263 | 0.141 | 0.040 |
| Fe removal % | — | 11.12 | 25.48 | 59.94 | 88.72 |

At the end of Step 1, further precipitation of arsenic as scorodite was induced by adding into the generated scorodite slurry iron oxyhydroxide (this constitutes Step 2) that had been prepared as per method described in Part A. More specifically for the precipitation of scorodite we used the iron oxyhydroxide produced under the following conditions described in Table 3.

TABLE 3

Conditions used to produce iron oxyhydroxide for scorodite precipitation.

| | |
|---|---|
| $FeSO_4 \cdot 7H_2O$ | 0.42 mol/L (23.4 g/L Fe) |
| MgO, base | 1.01 mol/L (40.50g/) |
| Flow rate of base | 2.1 mL/minute |
| Agitation | 630 rpm |
| Temperature | 21° C., room temperature |
| $O_2$ sparging | Yes |
| Time | 60-150 min |

XRD analysis determined the precipitated iron oxyhydroxide to match the crystal structure of goethite (60 min precipitate) and mixture of goethite and lepidocrocite (90-150 min). The supernatant solution was decanted after the iron oxyhydroxide solids had settled and the settled iron oxyhydroxide precipitate was used to produce scorodite. The iron oxyhydroxide was added in doses every ten minutes. The addition was completed in an hour. When the addition of iron oxyhydroxide was completed, $O_2$ sparging was stopped.

The Scorodite Production Conditions During Step 2 were:
Temperature: 90° C., Time: 4 hours (includes 1 hr FeOOH addition), Agitation: 750 rpm, molar ratio Fe (added as FeOOH):As (initial)=0.6; $O_2$ sparging.

Figure 3A:
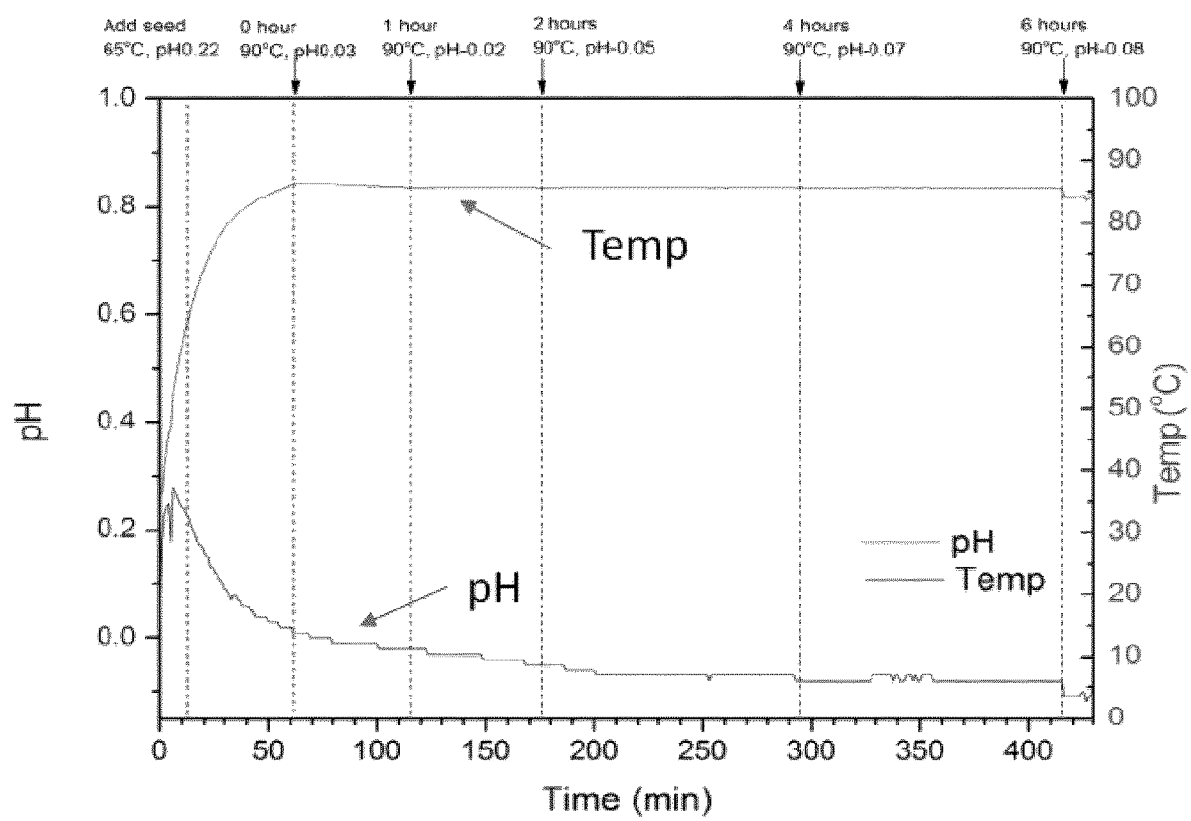
FIG. 3A: Graphs showing the pH and temperature evolution of scorodite precipitation with Fe(III) sulfate addition (Fe/As=0.7)—STEP 1.
Figure 3B:
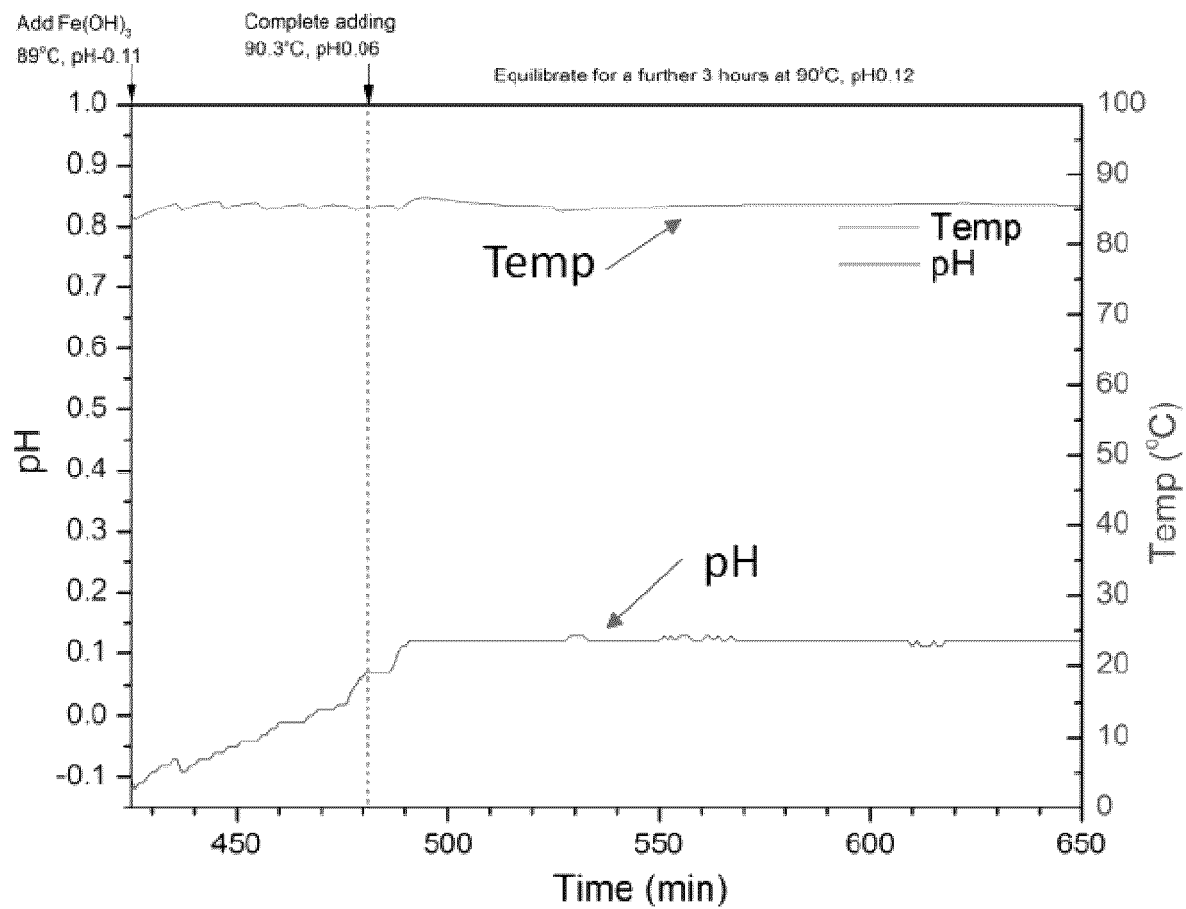
FIG. 3B: Graphs showing the pH and temperature evolution of scorodite precipitation with iron oxyhydroxide (Fe/As=0.6)—STEP 2 (EXP 90 min)

Table 4 shows the arsenic and iron concentration during the precipitation reaction. The final As concentration is 1.29 g/L corresponding to over 96% precipitation efficiency (conversion of initial arsenic to crystalline scorodite). FIG. 3A shows the pH and temperature evolution during the atmospheric scorodite preparation at Fe:As=0.7 and FIG. 3B shows the pH and temperature evolution during the further precipitation step with iron oxyhydroxides (EXP90 min).

TABLE 4

Arsenic and iron concentration during scorodite precipitation (STEP2) with iron oxyhydroxide (EXP 90 min).

| Reaction time (hours) | 0 | 1 | 2 | 3 | 4 |
|---|---|---|---|---|---|
| [As] (g/L) | 14.60 | 7.98 | 4.09 | 2.04 | 1.29 |
| As removal % | | | | | 96.53 |
| [Fe] (g/L) | 2.22 | 7.50 | 6.73 | 5.87 | 5.34 |
| Fe removal % | | | | | 74.49 |

FIG. 4 shows the XRD pattern of scorodite precipitated with iron oxyhydroxide (STEP 2) and the XRD pattern of the iron oxyhydroxide used. As it can be seen, all the peaks in the scorodite product can be indexed to the mineral scorodite with no detectable presence of goethite or lepidocrocite.

Washing/Repulping of Scorodite Product

Figure 5A:
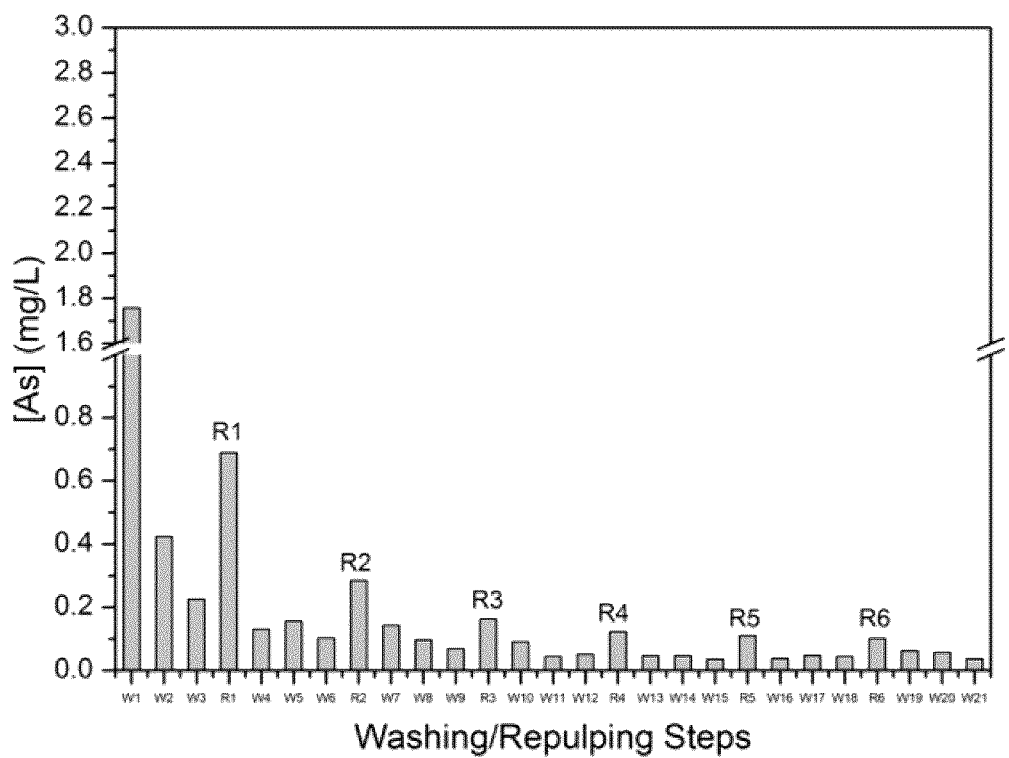
FIG. 5A: Total arsenic released over 6 washing/repulping cycles.
Figure 5B:
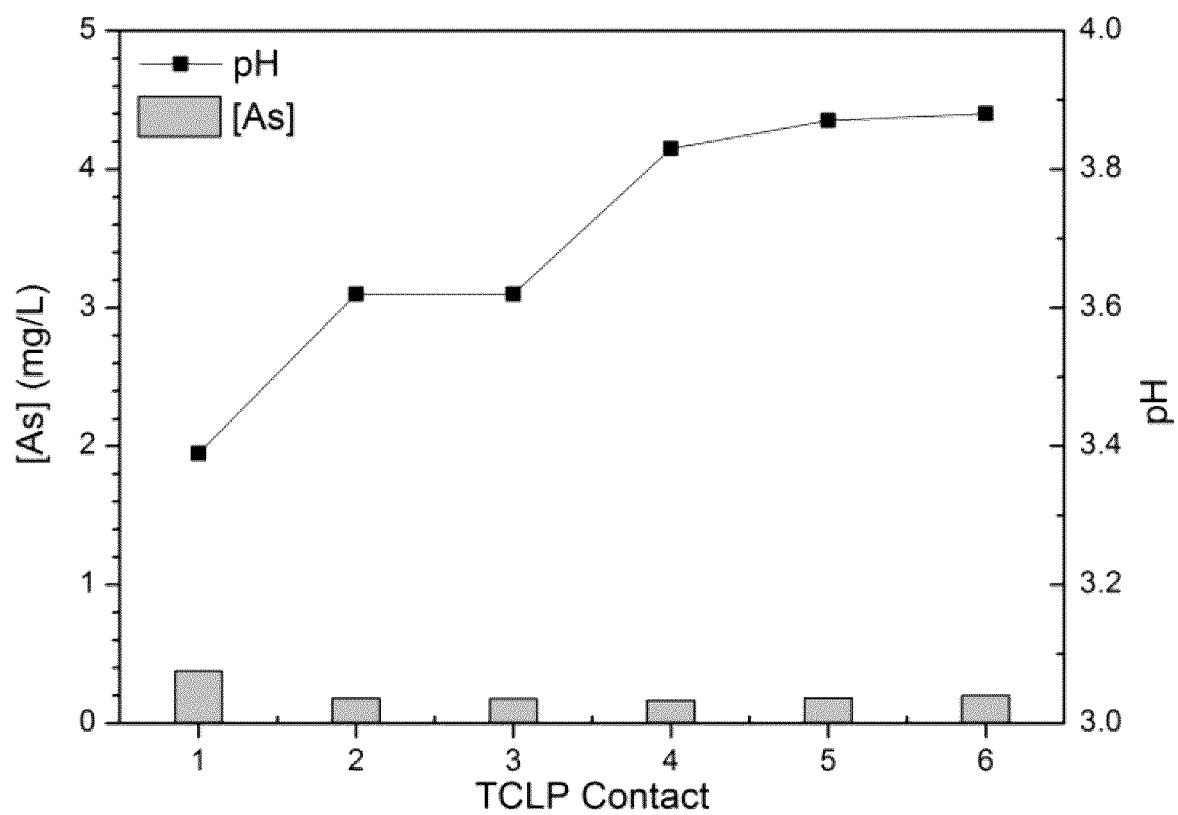
FIG. 5B: TCLP-type leachability test release of arsenic.

The produced scorodite particles were subjected to 6 cycles of washing/repulping followed by TCLP-type of leachability testing. The TCLP (Toxicity Characterization Leachability Procedure) testing involved placing a wet equivalent of 2 g dried scorodite in a 125 mL Erlenmeyer flask filled with 80 mL de-ionized water (40:1 ratio of liquid to solids). The flask was agitated with orbital shaker at 50 rotation/min for 24 hours before filtering the slurry on a vacuum filter. As shown in FIGS. 5A and 5B, the total arsenic released by washing/repulping and subsequent TCLP testing is lower than 0.2 mg/L.

Effect of Oxygen Sparging During Scorodite Precipitation

In addition to the test described above where FeOOH produced after 90 min neutralization was used, different kinds of iron oxyhydroxide precipitates were used to produce scorodite in Step 2. (Step 1 involved precipitation of scorodite with addition of ferric sulfate at Fe(III)/As(V) molar ratio 0.7—see Table 2.) Precipitation in Step 2 was carried out with or without oxygen sparging by adding the oxyhydroxide at Fe/As molar ratio=0.4. The other conditions were as in previous test: Temperature: 90° C., Time: 4 hours (includes 1 hr FeOOH addition), Agitation: 750 rpm, $O_2$ sparging.

The precipitated scorodite powders were collected and subjected to TCLP leachability testing. Table 5 shows arsenic removal percentage of scorodite precipitation using different iron oxyhodroxide precipitates as iron sources (in Step 2) with or without $O_2$ sparging. As shown with the exception of the test using magnetite, oxygen sparging did not have a major effect on arsenic conversion to scorodite.

TABLE 5

Scorodite precipitation using different iron oxyhydroxides in Step 2 with and w/o $O_2$ sparging.

| No. | Iron source | $O_2$ sparging | Arsenic removal percentage (%) |
|---|---|---|---|
| 1 | FeOOH (90 mm) | Yes | 96.53 |
| 2 | FeOOH (90 mm) | No | 96.22 |
| 3 | FeOOH (60 mm) | Yes | 93.92 |

TABLE 5-continued

Scorodite precipitation using different iron
oxyhydroxides in Step 2 with and w/o O₂ sparging.

| No. | Iron source | O₂ sparging | Arsenic removal percentage (%) |
|---|---|---|---|
| 4 | FeOOH (60 mm) | No | 89.36 |
| 5 | $Fe_3O_4$ | Yes | 90.32 |
| 6 | $Fe_3O_4$ | No | 79.05 |

D. Precipitation by Staged Addition of Ferric Sulfate

Another important discovery during the course of this work was that staged addition of ferric iron leads to faster precipitation of scorodite resulting in higher reaction yield. This is exemplified with the data presented in Table 6 below. As it can be seen keeping the Fe(III)/As(V) molar ratio below 1 and adding the ferric iron (in this case as ferric sulfate salt) in stages leads to higher percentage yield (compare Tests 1, 2 and 6).

TABLE 6

Scorodite precipitation by staged
addition of ferric sulfate: 95° C., 40 g/L
As(V), 5 g/L seed; no pH control (initial pH~0.4).

| Test No. | Fe(III) Addition Steps; Fe(III)/As(V) | Time (hr) | Scorodite Product Yield (%) |
|---|---|---|---|
| 1 | 1 step<br>Fe(III)/As(V) = 1 | 8 | 68.5% |
| 2 | 2 steps<br>Fe/As = 0.7, 0.3 | 8 | 82.3% |
| 3 | 3 steps,<br>Fe/As = 1/3, 1/3, 1/3 | 9 | 73.3% |
| 4 | 3 steps,<br>Fe/As = 0.6, 0.3, 0.1 | 9 | 81.4% |
| 5 | 6 steps,<br>Fe/As = 0.5, 0.1, 0.1, 0.1, 0.1, 0.1 | 6 | 83.0% |

E. Removal and Fixation of Residual Arsenic

As it can be seen with the results presented in Part B (Table 4) there is about 4% of the initial arsenic remaining in solution. Here we offer a method to remove the residual arsenic (~1 g/L) by co-precipitation with a bit excess of ferric iron (~3-4 moles per mol of dissolved arsenic) added to the filtrate (after separation of scorodite solids) and subjected to partial neutralization with a base like MgO (or ZnO or $Cu(OH)_2$ or $CuCO_3$ and so on), separating the amorphous co-precipitate, and returning it to the front end of the scorodite precipitation circuit. There the amorphous co-precipitated solids redissolve due to prevailing strong acid (pH<1) and re-precipitate as crystalline scorodite. In this way arsenic concentration can be brought down to few mg/L range while all arsenic is converted to crystalline scorodite for safe disposal. Upon filtration to recover the clean scorodite, the Fe/As molar ratio (if necessary) is raised to 4 (e.g. with a small amount of ferric sulfate) followed by pH adjustment to ~4 or higher depending on the other metals present in solution causing the co-precipitation of As(V) with ferric iron (Jia Y. et al. *Water Research*, (2008) 42, 661-668). For example a residual arsenic concentration of 990 mg/L As(V) and 3400 mg/L Fe(III) was reduced to 4 mg/L As (and 16 mg/L $Fe^{3+}$) at pH 4 and 0.1 mg/L As at pH 6.5. The collected co-precipitate was added to a new batch of 40 g/L As(V) in which ferric sulfate was added to bring the Fe/As ratio to 0.87 and subjected to scorodite precipitation at 95° C. for 8 hours. The produced scorodite had the same characteristics as when no co-precipitate was used. This demonstrates the feasibility of converting essentially 100% of soluble arsenic to scorodite.

All references cited herein as well as their respective content are incorporated by reference in their entirety.

The invention claimed is:

1. A process for producing crystalline scorodite substantially free of gypsum, comprising adding an iron oxyhydroxide compound into an arsenic solution in pentavalent state to cause the formation of the scorodite at a molar ratio of Fe(III)/As(V)<1, wherein a total iron added is in molar units in the range of 1≤Fe(III)/As(V)≤1.5;

or a first step of adding a ferric iron solution into an aqueous acidic solution of arsenic solution in pentavalent state (As(V)) to cause the formation of an amount of said scorodite, followed by a second step of adding an iron oxyhydroxide compound into said arsenic solution in pentavalent state to cause the formation of a further amount of said scorodite wherein said ferric iron is at a molar ratio Fe(III)/As(V)<1, wherein a total iron added is in molar units in the range of 1≤Fe(III)/As(V)≤1.5;

wherein said process is further conducted at a temperature of from about 30° C. to about 100° C.

2. The process of claim 1, wherein said process is conducted at a temperature above 50°.

3. The process of claim 1, wherein said As(V) solution is prepared by oxidation of an As(III) containing solution.

4. The process of claim 1, wherein said solution of As(V) has a concentration of from 1 g/L to 100 g/L.

5. The process of claim 1, wherein said acidic solution is a strong acidic solution generated from $H_2SO_4$ leaching operations, or HCl or $HNO_3$, or mixed acids.

6. The process of claim 1, wherein the acid concentration range is from more than 0.1 mol/L to ≤1 mol/L.

7. The process of claim 1, comprising adding in said acidic solution scorodite seeds.

8. The process of claim 1, wherein said step of adding the iron oxyhydroxide compound into said aqueous acidic solution of arsenic is comprising separate additions of divided amounts of the iron oxyhydroxide compound, with interruption between said additions.

9. The process of claim 1, wherein said step of adding the iron oxyhydroxide compound into said aqueous acidic solution of an arsenic compound is performed with simultaneous sparging of air or oxygen.

10. The process of claim 1, wherein said ferric iron is ferric sulfate.

11. The process of claim 10, wherein said ferric solution is added to said solution of arsenic compound in separate divided amounts from 0.1 to 0.7 mol relative to one mole of As(V).

12. The process of claim 1, wherein said iron oxyhydroxide is prepared by reaction of $FeSO_4$-containing acidic solution with oxidation, in presence of a base that does not form secondary precipitates.

* * * * *